(12) United States Patent
Rudolf et al.

(10) Patent No.: US 7,188,828 B2
(45) Date of Patent: Mar. 13, 2007

(54) HYDRAULIC BEARING

(75) Inventors: Hans-Joachim Rudolf, Weinheim (DE); Arnold Simuttis, Bad Kreuznach (DE)

(73) Assignee: Carl Freudenberg KG (DE)

( * ) Notice: Subject to any disclaimer, the term of this patent is extended or adjusted under 35 U.S.C. 154(b) by 0 days.

(21) Appl. No.: 10/388,014

(22) Filed: Mar. 13, 2003

(65) Prior Publication Data

US 2003/0178755 A1 Sep. 25, 2003

(30) Foreign Application Priority Data

Mar. 21, 2002 (DE) ................................ 102 12 692

(51) Int. Cl.
*F16F 5/00* (2006.01)
*F16F 13/00* (2006.01)
*F16F 15/00* (2006.01)

(52) U.S. Cl. ............................. 267/140.13; 267/141.4

(58) Field of Classification Search ........... 267/140.11, 267/140.13, 141.2, 141.7, 219, 136, 141.4, 267/141.5, 141.3
See application file for complete search history.

(56) References Cited

U.S. PATENT DOCUMENTS

| 3,368,807 | A |   | 2/1968  | Thrasher ....................... 267/35 |
|-----------|---|---|---------|----------------------------------------|
| 4,889,325 | A | * | 12/1989 | Flower et al. .......... 267/140.13 |
| 4,921,049 | A | * | 5/1990  | Kaiser et al. .......... 267/140.13 |
| 5,104,100 | A |   | 4/1992  | Simuttis ................... 267/240.1 |
| 5,772,189 | A | * | 6/1998  | Satori et al. ............ 267/140.13 |
| 5,927,698 | A | * | 7/1999  | Miyoshi et al. ......... 267/140.13 |
| 6,131,893 | A | * | 10/2000 | Seynaeve et al. ...... 267/140.13 |
| 6,352,248 | B1 | * | 3/2002 | Hamaekers et al. ... 267/140.13 |
| 6,655,667 | B1 | * | 12/2003 | Hamaekers et al. ... 267/140.13 |
| 2002/0000688 | A1 | * | 1/2002 | Simuttis et al. ........ 267/140.13 |
| 2002/0043748 | A1 | * | 4/2002 | Meyer ................... 267/140.11 |

FOREIGN PATENT DOCUMENTS

| DE | 1300367    |   | 7/1969  |
|----|------------|---|---------|
| DE | 3808966    |   | 7/1988  |
| DE | 411 8490   |   | 5/1992  |
| DE | 404 1779   |   | 6/1992  |
| DE | 413 9048   |   | 6/1996  |
| DE | 199 32 583 |   | 12/2000 |
| DE | 19932583   | * | 12/2000 |
| EP | 0191703    |   | 8/1986  |
| EP | 03 54 381  |   | 12/1993 |
| JP | 3288036    | * | 12/1991 |
| JP | 3292431    | * | 12/1991 |
| JP | 7167201    |   | 4/1995  |

* cited by examiner

*Primary Examiner*—Devon Kramer
(74) *Attorney, Agent, or Firm*—Harness, Dickey & Pierce, P.L.C.

(57) ABSTRACT

A hydraulic bearing includes a supporting bearing, a bearing base, and an annular spring element of elastomeric material interconnecting the supporting base and the bearing base. A working chamber and a compensating chamber are bounded by the supporting bearing and bearing base and filled with damping fluid. A partition having an opening separates the working chamber from the compensating chamber. The opening connects the working chamber and the compensating chamber in a fluid-conducting manner. An annular stop is disposed in the working chamber and is movable relative to the supporting bearing in an axial direction. An inner peripheral edge of the annular stop is received in a receiving portion of the supporting bearing. A ratio of a thickness of the inner peripheral edge in the axial direction and a height of the receiving portion in the axial direction is 0.5 to 1.

24 Claims, 4 Drawing Sheets

HYDRAULIC BEARING

Priority is claimed to German Patent Application No. DE 102 12 692.5-12, filed on Mar. 21, 2002, which is incorporated by reference herein.

BACKGROUND

The present invention relates to a hydraulic bearing including a supporting bearing and a bearing base which are interconnected by an essentially hollow-cone shaped spring element of elastomeric material and which bound a working chamber and a compensating chamber, the working chamber and the compensating chamber being filled with damping fluid and separated from one another on their facing sides by a partition having at least one opening, the opening connecting the working chamber and the compensating chamber in a fluid-conducting manner, the supporting bearing being connected, on its side facing the partition, to an annular stop which is arranged in the working chamber in such a manner that it is movable relative to the supporting bearing at least axially in the direction of the introduced vibrations, and the stop being received at its inner circumference in a receiving means of the supporting bearing.

A hydraulic bearing of that kind is known from German Patent DE 38 08 996 C2. The stop has an annular shape and includes a supporting body which is sheathed with a jacket of elastomeric material on the radially inner side and on the radially outer side. The supporting body has a constant thickness, the ratio from the thickness of the inner peripheral edge of the stop and the height of the receiving portion, in each case axially in the direction of the introduced vibrations, being approximately 0.3. Due to the jacket which encloses the supporting body on the radially inner side and which has a thickness in an axial direction on both sides of the surfaces of the supporting body, which is greater than that of the supporting body, the stop is suspended with high axial and radial movability. Cardanic movements of the stop are specifically desired. A system of that kind has the advantage that low-frequency, large-amplitude vibrations are readily cushioned; the damping hydraulics of the stop, however, generating a hydraulic hardening as well as resonances when the frequency exceeds 200 Hz. This results in disadvantages in the isolation of higher-frequency, small-amplitude vibrations.

European Patent EP 0 191 703 B1 describes another hydraulic bearing having a stop which is rigidly connected to the supporting bearing. Due to the rigid connection, unwanted resonances are generated when higher-frequency vibrations are introduced, resulting in very high dynamic spring rates.

SUMMARY OF THE INVENTION

An object of the present invention is to further develop a hydraulic bearing in such a manner that Cardanic movements of the stop inside the working chamber are avoided to the greatest possible extent and that stop therefore does not negatively influence the damping properties of the hydraulic bearing. Nevertheless, the stop is intended to allow good isolation of higher-frequency, small-amplitude vibrations in the range from 100 to 1200 Hz by coupling it softly to the supporting bearing or by designing it so as to have clearance. In this manner, the generation of operational noise is reduced to a minimum.

The present invention provides a hydraulic bearing that includes a supporting bearing and a bearing base which are interconnected by an essentially hollow-cone shaped spring element of elastomeric material and which bound a working chamber and a compensating chamber. The working chamber and the compensating chamber are filled with damping fluid and separated from one another on their facing sides by a partition having at least one opening, the opening connecting the working chamber and the compensating chamber in a fluid-conducting manner. The supporting bearing is connected, on its side facing the partition, to an annular stop which is made of tough material and arranged in the working chamber in such a manner that it is movable relative to the supporting bearing at least axially in the direction of the introduced vibrations. The stop is received at its inner circumference in a receiving portion of the supporting bearing. The ratio from the thickness (12) of the inner peripheral edge (13) of the stop (9) and the height (14) of the receiving portion (11), in each case axially in the direction of the introduced vibrations (10), is 0.5 to 1.

Provision is made for the ratio from the thickness of the inner peripheral edge of the stop and the height of the receiving portion, in each case axially in the direction of the introduced vibrations, to be 0.5 to 1. In this connection, it is an advantage that hydraulic damping effects and hardenings are prevented by the large surfaces for axial and radial guidance of the stop; the stop can move in an axial direction parallel to the axis of the hydraulic bearing; whereas Cardanic deflections of the stop are ruled out because the receiving portion is at the same time designed as a guide for the stop.

The ratio from the thickness of the inner peripheral edge of the stop and the height of the receiving portion, in each case axially in the direction of the introduced vibrations, is preferably 0.65 to 0.9. Due to this comparably narrow range of the ratio, the guidance of the stop in the receiving portion is further improved. The working properties of the hydraulic bearing with respect to the isolation of higher-frequency, small-amplitude vibrations are particularly good when the aforementioned ratio is smaller than 1, since the stop is then arranged inside the working chamber as a backlash. However, if the ratio is 1, then the stop is slightly clamped in the receiving portion and can therefore no longer move so easily with respect to the supporting bearing.

The receiving portion can have the shape of a radially outwardly open groove. A receiving portion of that kind is particularly easy to manufacture. The receiving portion can be produced in a chip-removing manufacturing process, for example, by turning on a lathe or, in case of large batches, by deep drawing.

The receiving portion can be formed by a bottom which forms the groove base and extends substantially parallel to the axis of the hydraulic bearing and by lateral boundary walls which extend essentially in a radial direction and are associated with each other in the vicinity of and at an axial distance from each other, and which bound the height of the receiving portion. The surfaces of the bottom and of the boundary walls facing the stop are designed as guide surfaces allowing the stop to move without jamming while avoiding Cardanic deflection movements with respect to the supporting bearing.

In another embodiment, provision can be made for a downwardly open groove.

The receiving portion can be part of a one-piece supporting bearing or formed by the bottom and the boundary wall of the supporting bearing that faces the partition, the boundary wall of the receiving portion that faces axially away from the partition being formed, for example, by a screw head. The receiving portion of the supporting bearing can be bounded by the screw head of a fastening screw, which penetrates the supporting bearing in an axial direction from the working chamber toward the surroundings. In the context of the present invention, a design of that kind is preferred because it simplifies the mounting of the stop to the supporting bearing and because a fastening screw is needed anyway to attach the supporting bearing to one of the machine elements to be supported. For assembly, initially the stop is inserted with its radially inner edge into the angular recess of the supporting bearing provided for this purpose and captively held in position by mounting the fastening screw, whose the screw head forms the boundary wall of the receiving portion that faces the partition. The supporting bearing, the stop and the fastening screw form a preassembled unit. This simplifies the manufacture and assembly of the hydraulic bearing. However, if the periphery of the bearing requires a nut as a fastening element, then this nut is pressed or cast into the supporting bearing, and a disk is attached to the nut as an abutment. The disk can, for example, be riveted on.

The receiving portion can at least partially be coated with a coating of elastomeric material. Movements of the stop within the receiving portion occur almost noiselessly because of the surface coating of the receiving portion with elastomeric material, and the movement of the stop into its end position is damped by the coating. This effect can be further improved by elastomeric thickenings on the stop in the form of knobs, bead, warts, spherical caps, etc.

The bottom is designed as an axially extending guide for the stop. Since the stop acts not only in the direction of the introduced vibrations, parallel to the axis of the hydraulic bearing, it is highly advantageous for the stop to be guided in this direction to prevent Cardanic deflection movements of the stop. In this manner, a positive, stable support is achieved during transverse movements.

In order for relatively movable parts to be properly guided, it is advantageous if the touching guide surfaces are comparably large to prevent the parts from jamming together. In order to achieve such a comparably long guide, the stop is preferably provided with a bead-shaped enlargement at its inner circumference radially inside the receiving portion, the bead-shaped enlargement preferably having a thickness which is at least double that of the stop outside the receiving portion.

The thickening can be formed by a beaded edge. Edge beading is a manufacturing process, which is easy and inexpensive to carry out, especially if the stop or the supporting body of the stop is made of sheet metal. In order to make the enlargement, the radially inner peripheral edge of the stop can be bent over substantially in the form of a loop.

The ratio from the diameter of the bottom and the diameter of the inner peripheral edge of the stop can be 0.7 to 1, preferably 0.8 to 0.95. A ratio close to 1, on one hand, allows the stop to readily move in and relative to the receiving portion and, on the other hand, allows the two parts to be properly guided relative to each other, because the diameter of the bottom is only very slightly smaller than the diameter of the inner peripheral edge of the stop.

Outside the receiving portion, the stop can have an essentially constant thickness. Components having a constant thickness are particularly easy to manufacture and process.

The stop can include a supporting body of tough material, which is at least partially sheathed with a jacket of elastomeric material. A design of that kind presents itself especially if, for example, the surfaces of the receiving portion facing the stop are made of metallic material, that is, if the surfaces are not provided with a coating of elastomeric material. However, the supporting body can also be provided with a jacket as a corrosion protection, the supporting body preferably being completely enclosed by the jacket in such a case. At the same time, the jacket serves to seal connection points in the case of a pressed-in screw or nut and in the case of joints occurring on composite-cast supporting bearings of aluminum/steel or plastic/steel.

The ratio of the thickness of the jacket to the thickness of the supporting body can be 0.1 to 0.5, preferably 0.1 to 0.2. A jacket thickness, which is much smaller compared to the thickness of the supporting body has a particularly positive effect on the accurate guidance of the stop within the receiving portion. Due to the only small thickness of the jacket, the jacket has only a low elastic flexibility so that the good guidance resulting therefrom prevents Cardanic movements of the stop within the receiving portion. The comparably thin jacket is completely sufficient for a good corrosion protection of the supporting body and for preventing impact noises during movements of the stop within the receiving portion.

The stop or the supporting body of the stop can be composed of sheet steel or sheet aluminum. Suitable sheets are available at a reasonable cost and are easy to machine. The stop or the supporting body of the stop can be manufactured, for example, by deep drawing, in a simple and cost-effective manner.

Different materials, such as polymeric materials, can also be used in place of sheet metal to manufacture the stop or the supporting body of the stop.

The radially inner edge and the radially outer edge of the stop can each be deformed in the same direction, namely axially toward the supporting bearing or axially toward the partition. To support large compression stroke forces in the direction of the partition, it is recommended to deform the stop edge from above toward the partition for smallest possible deflection of forces, because then the force is introduced from the radially extending supporting surface directly into the conical part. If the larger forces occur in the pull direction, it is recommended to deform the edge from below upward, so that an outwardly open groove is formed. If the stop is only needed to improve the isolating properties without transmitting large forces, the shape can be simplified such that support is accomplished by a groove, which is open toward the partition.

The stop can have at least three stiffening corrugations for reinforcement, which are uniformly distributed in a circumferential direction. The stiffening corrugations are intended to prevent plastic deformation of the stop when it hits the axially neighboring adjacent components, even if the stop or the supporting body of the stop is only made, for example, of comparably thin sheet metal which would easily undergo unwanted deformation without the integrally formed stiffening corrugations.

The stiffening corrugations are preferably part of the supporting body and can, for example, be integrally formed in one operation during the deep-drawing of the stop.

The stiffening corrugations can be curved forward toward the spring element. In case of a sudden loading of the hydraulic bearing under pressure and striking of the stop against the partition, plastic deformations of the stop are particularly effectively avoided by the stiffening corrugations which are curved forward toward the spring element.

The boundary wall of the working chamber can surround the outer peripheral edge of the stop at a radial distance, allowing the damping fluid to flow through the annular gap formed by the distance. The stop and the shape of the gap are designed such that the damping fluid present within the gap and around the stop can be displaced virtually without resistance. In this manner, unwanted hardening of the hydraulic bearing due to damping effects is avoided.

The stop can have a flange which extends essentially in a radial direction and is able to be abutted against a radial projection of the bearing base or against the partition to limit extreme deflections.

The spring element and the flange, as viewed in the longitudinal section of the hydraulic bearing, can have a radial overlap which is larger than the gap in the same direction. In this manner, a long service life is achieved because the stop can support itself against the boundary wall over a large surface with its externally applied rubber coating and does not press against the connecting edges of the spring element. This results, at the same time, in large load-bearing surfaces in an axial direction which load the jacket of the stop only slightly in the case of high axial forces and which also contribute to increasing the service life of the bearing.

The partition can be designed as a nozzle cage and include an upper part and a lower part, a membrane of rubber-elastic material being arranged axially between the upper part and the lower part such that it is capable of vibrating to isolate higher-frequency, small-amplitude vibrations. The exposed membrane surface within the partition should preferably be designed to be of maximum size; it being possible for this purpose to be served also by radial openings which reach up to the edge of the membrane in the sealing area. However, functional impermeability must be maintained. When higher-frequency, small-amplitude vibrations are introduced, the membrane moves between the upper part and the lower part out of phase with the introduced vibrations in order to isolate them.

An opening of the partition can be designed as a damping conduit which is bounded by the upper part and the lower part, as viewed in the axial direction of the hydraulic bearing, and which surrounds the membrane at the outer circumference. Due to the large diameter of the damping conduit, the liquid mass located inside the damping conduit is also comparably large. When low-frequency, large-amplitude vibrations are introduced, the damping fluid present in the damping conduit is moved back and forth between the working chamber and the compensating chamber. On the side facing away from the working chamber, the compensating chamber is bounded by a membrane, which receives volume in an essentially pressureless manner.

BRIEF DESCRIPTION OF THE DRAWINGS

In the following, two exemplary embodiments of the hydraulic bearing according to the present invention are explained in greater detail with reference to the drawings, in which.

DETAILED DESCRIPTION

Figure 1:
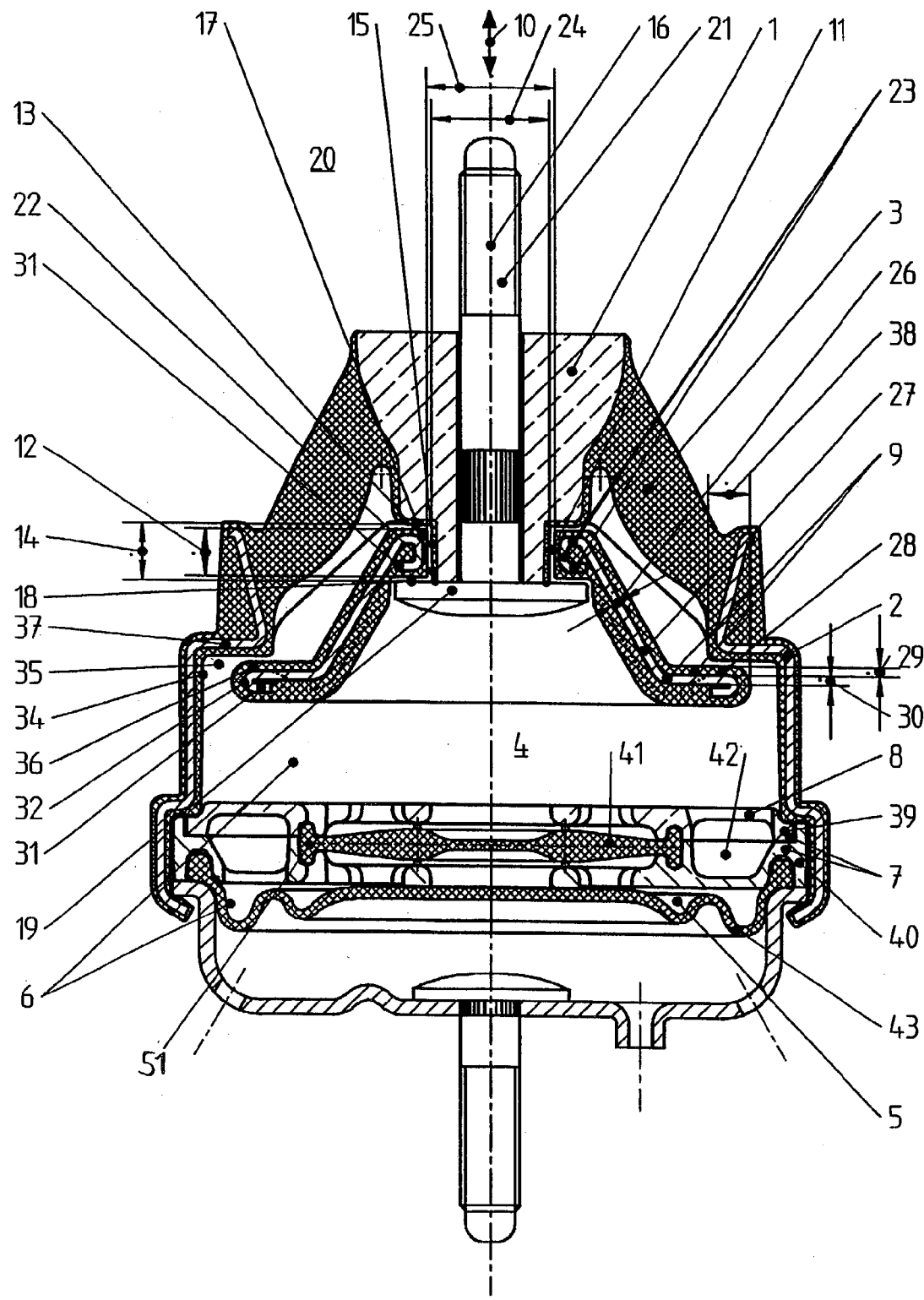
FIG. 1 shows a first exemplary embodiment of a hydraulic bearing.
Figure 5:
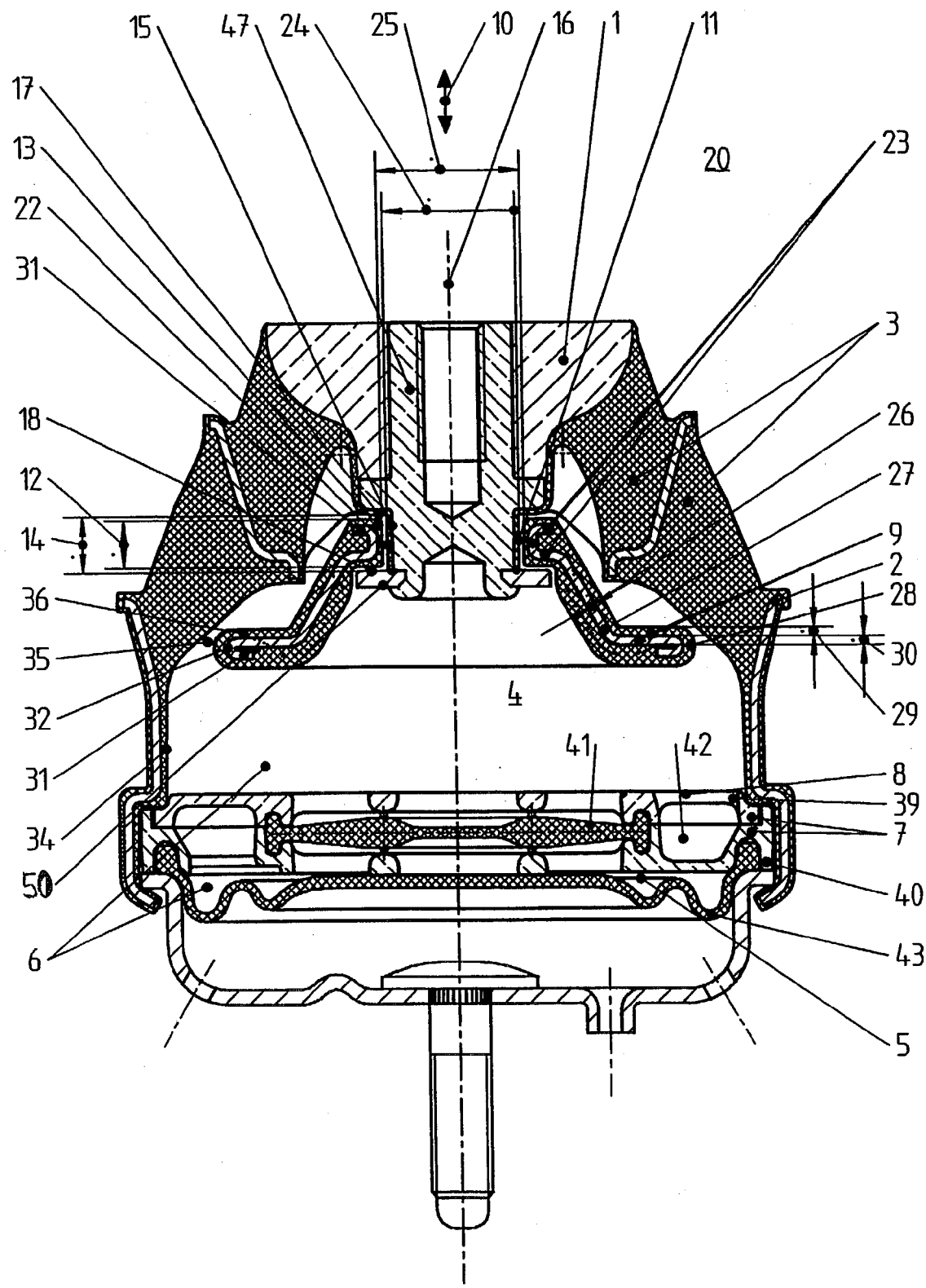
FIG. 5 shows a variant of the hydraulic bearing in which the stop acts only in the direction of the compression stroke.
Figure 6:
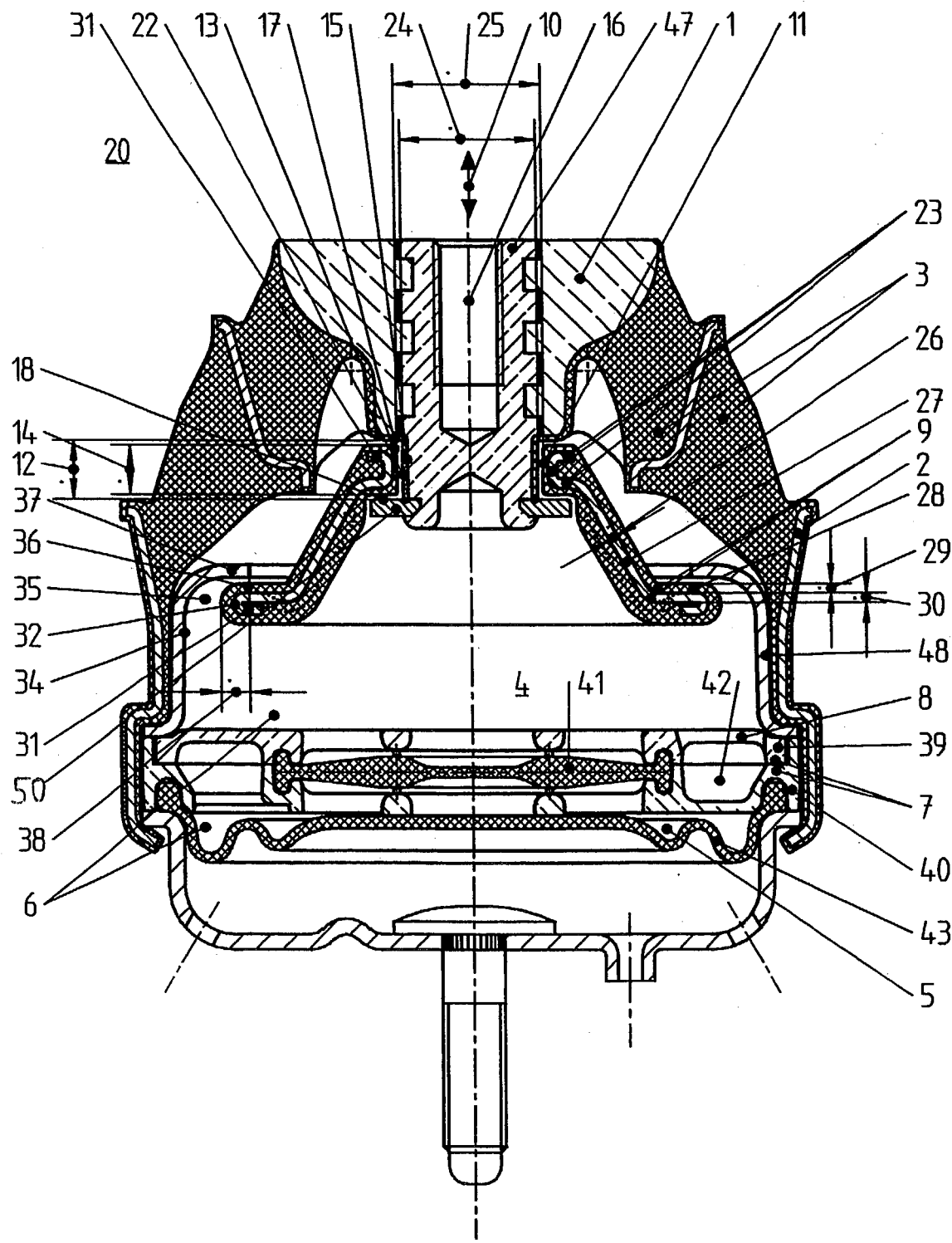
FIG. 6 contains a bearing for large deformations and a spring element that is suitable for this purpose, using an additional, cup-shaped abutment in the pull direction.

FIGS. 1, 5 and 6 each show an exemplary embodiment of a hydraulic bearing.

Each of the hydraulic bearings includes a bearing axis 16, supporting bearing 1 and a bearing base 2 which are interconnected by hollow-cone shaped spring element 3. Both supporting bearing 1 and bearing base 2 are composed of a metallic material; spring element 3 is made of an elastomeric material.

Supporting bearing 1, bearing base 2, and spring element 3, together with a closing membrane 43 which receives volume in an essentially pressureless manner, bound the interior space of the hydraulic bearing, in which are arranged stop 9 and partition 7. Partition 7 bounds working chamber 4 and compensating chamber 5 and has an opening 8 which is designed as a damping conduit 42. Working chamber 4 and compensating chamber 5 are connected by damping conduit 42 in a fluid-conducting manner. In the exemplary embodiments shown here, partition 7 is designed as a nozzle cage and includes an upper part 39 and a lower part 40. In the central region of partition 7, upper part 39 and lower part 40 are provided with openings so that the membrane, which is capable of vibrating axially in the direction of introduced vibrations 10, is pressurized with damping fluid 6 in working chamber 4 and compensating chamber 5. In the exemplary embodiments shown here, the membrane is clamped at the edge between the upper part 39 and the lower part 40, forming a dynamic seal.

The following is an explanation of the function of the bearing:

When high-frequency, small-amplitude vibrations 10 are introduced into the hydraulic bearing, no exchange of damping fluid 6 takes place between working chamber 4 and compensating chamber 5. Membrane 41, connected at sealing bead 51, vibrates out of phase with introduced vibrations 10, preferably 180 degrees out of phase, thus reducing the high-frequency, small-amplitude vibrations, for example, in a range from 100 to 1200 Hz.

However, when low-frequency, large-amplitude vibrations are introduced into the hydraulic bearing, damping fluid 6 is conveyed from working chamber 4 through damping conduit 42 into compensating chamber 5, and subsequently back again over the same path. In this context, the damping effect is based on the inertia of the liquid column of damping fluid 6 present inside damping conduit 42.

Figure 3:
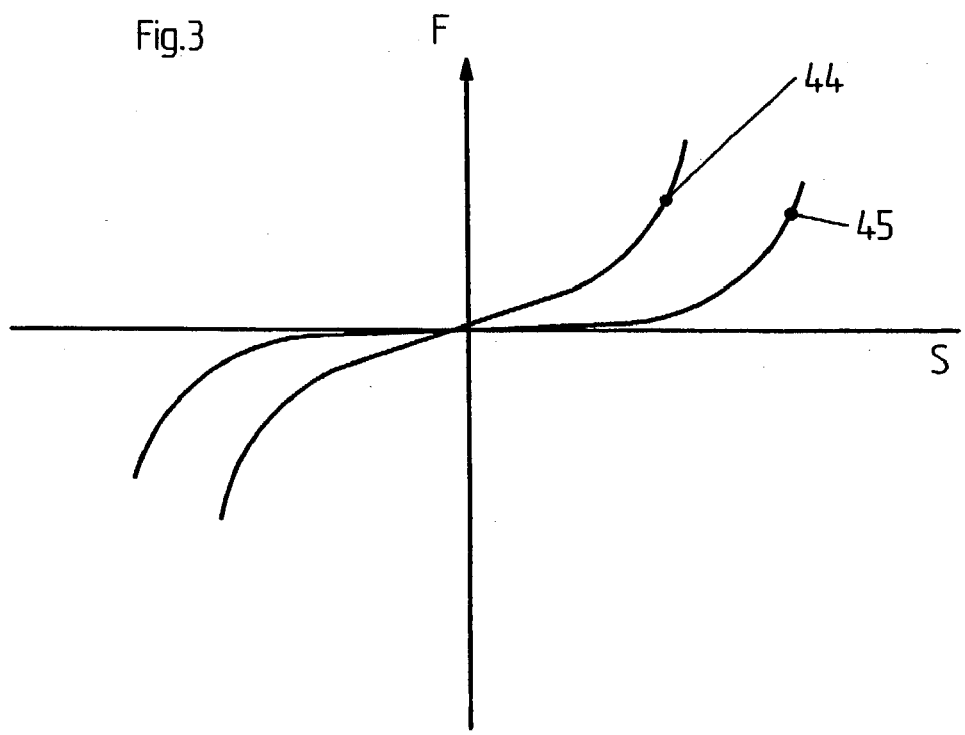
FIG. 3 is a load-displacement diagram; one of the curves representing the stop that is gently clamped in the receiving portion, the other curve representing the stop that is loosely arranged in the receiving portion.

In order for stop 9 to have as small an influence as possible on the working properties of the hydraulic bearing, it is required that the stop does not transmit any or only small forces when higher-frequency, small-amplitude vibrations are introduced, and that it has a progressive load-displacement characteristic when large-amplitude, low-frequency vibrations, for example, having amplitudes of more than 1 millimeters, are introduced (compare FIG. 3). The flow around stop 9 should have the minimum possible effects on the working properties of the hydraulic bearing, resulting in a characteristic of the dynamic spring rate which is optimized and as linear as possible over the frequency range up to 1.200 Hz with amplitudes $\leq 0.2$ mm.

Stop 9 has an annular design and is located inside the working chamber. It is composed of a tough material and arranged such that it can move relative to supporting bearing 1 axially in the direction of introduced vibrations 10. At its inner circumference, stop 9 is received in a receiving portion 11 of supporting bearing 1, namely in such a way that it is relatively movable at least axially in the direction of the introduced vibrations 10. With regard to good working properties, it has proven advantageous for the ratio from thickness 12 of inner peripheral edge 13 of stop 9 and height 14 of receiving portion 11, in each case axially in the direction of introduced vibrations 10, to be 0.5 to 1. In the exemplary embodiment shown here, the ratio is 0.85.

Supporting bearing 1 and fastening screw 21, together with stop 9, form a preassembled unit. Fastening screw 21 axiallly penetrates the supporting bearing from the working chamber to an exterior 20 of the supporting bearing. Receiving portion 11 is bounded by screw head 19 of fastening screw 21 by bottom 15, which forms the groove base, and the two boundary walls 17, 18. At its radially inner circumference, stop 9 is has a bead-shaped enlargement 23 inside receiving portion 11. In the exemplary embodiments shown here, the ratio from diameter 24 of bottom 15 and diameter 25 of inner peripheral edge 13 of stop 9 is 0.9.

In the exemplary embodiments shown here, stop 9 is completely sheathed with a jacket 28 of elastomeric material, and receiving portion 11 is also provided with a coating 22 of elastomeric material on the side facing stop 9 to reduce to a minimum the impact noises of the hydraulic bearing during its normal use. Thickness 29 of jacket 28, just as the thickness of coating 22 of receiving portion 1, is no thicker than is required to avoid impact noises and to ensure that stop 9 moves within receiving portion 11 only in radial and axial directions, but not in a cardanic manner.

With a view to good working properties, outer peripheral edge 32 of stop 9 is associated with boundary wall 34 of working chamber 4 in the vicinity thereof and at an axial distance therefrom, allowing damping fluid 6 to flow through annular gap 35 which is formed by the distance. Spring element 3 and the flange 36 have a radial overlap 38 which is larger than gap 35 in the same direction.

In FIG. 1, radially inner edge 13 and radially outer edge 32 of stop 9 are each deformed axially toward partition 7. In this connection, it is advantageous that no sharp edges are formed which could damage the elastomer upon contact with boundary wall 34 or elastomer spring 3.

Figure 2:
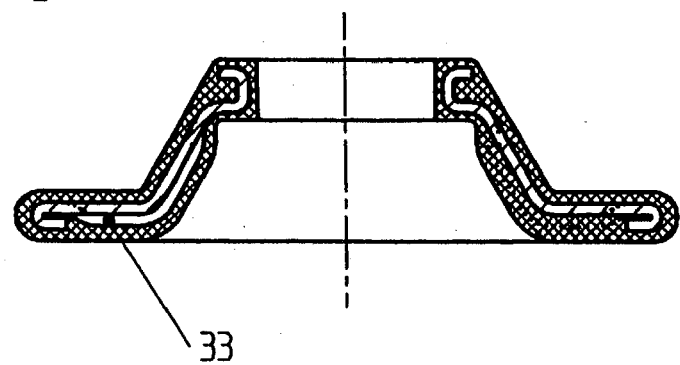
FIG. 2 shows a second exemplary embodiment of a stop which has a different design compared to the exemplary embodiment of FIG. 1.

The exemplary embodiment of FIG. 2 differs from the exemplary embodiment of FIG. 1 in the design of stop 9. Radially inner edge 13 and radially outer edge 32 of stop 9 are each deformed axially toward supporting bearing 1. This design is preferred especially when the intention is to find an inexpensive solution for manufacturing supporting body 27, having thickness 26, 30, fully automatically with high accuracy.

In the exemplary embodiments shown here, stop 9 has at least three stiffening corrugations for reinforcement which are uniformly distributed in a circumferential direction and which are each part of supporting body 27. Stiffening corrugations 33 are curved forward toward spring element 3 and made, for example, by deep drawing.

In order to limit extreme deflection movements of supporting bearing 1 with respect to bearing base 2 in an axial direction, stop 9 is able to be abutted (pushed) against the side of partition 7 facing the stop or (pulled) against a radial projection 37 of the bearing base 2 with its flange 36.

FIG. 3 is a load-displacement diagram. The curve denoted by 44 describes the spring characteristic of a stop 9 that is clamped in receiving portion 11 with only a small amount of force, whereas the curve denoted by reference numeral 45 shows the spring characteristic of a stop 9 that is loosely arranged in receiving portion 11. The ratio from thickness 12 of inner peripheral edge 13 of stop 9 and height 14 of receiving portion 11, in each case axially in the direction of introduced vibrations 10, is 1 for curve 44 while for curve 45, it is 0.85.

Figure 4:
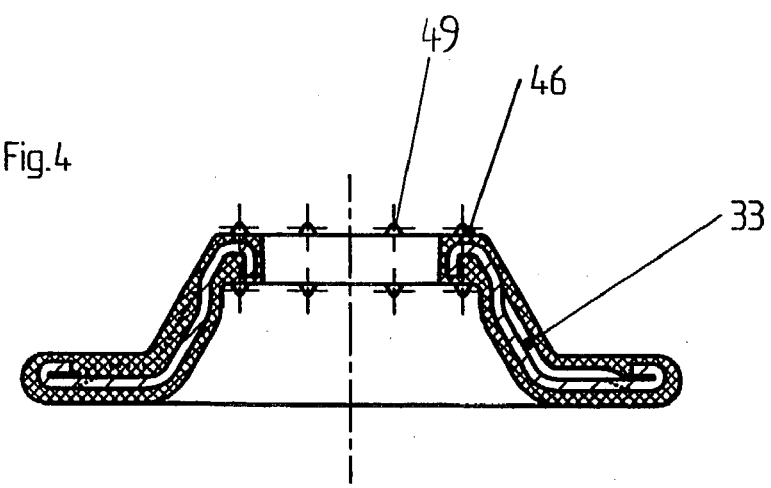
FIG. 4 depicts a further exemplary embodiment of a stop which implements characteristic 44 of FIG. 3.

FIG. 4 contains an embodiment of stop 9 which implements characteristic 44. To this end, jacket 28 features local thickenings 46, for example, in the form of knobs 49, opposite of coating 22. These thickenings permit movements of stop 9, but gently decelerate the motion of the stop prior to contact with receiving portion 11, so that no intrinsic noises of the bearing are generated.

FIG. 5 shows a variant of the hydraulic bearing in which stop 9 acts only in the direction of the compression stroke on partition 7. In this context, stop 9 assumes the load distribution from the center to the outer region of beaded edge 31, and thus loads only loading the outer, stable region of upper partition part 39 in order to avoid stressing the filigreed supporting region of membrane 41 that is located in the center of upper partition part 39.

Stop 9 itself is held by a special nut 47 which is designed for other screw-connection concepts than that shown in FIG. 1. In this context, a stable disk 50, which is riveted to nut 47, serves as an abutment for stop 9 in place of screw head 19 of FIG. 1. This has the advantage that many special vehicle assembly robots are able to work with screws, which can be handled more easily than nuts. Moreover, installation movements in the vehicle during servicing become smaller, considerably simplifying a repair, should the occasion arise.

FIG. 6 illustrates a variant of the bearing having a spring element 3 which is intended to permit very long paths in radial and axial directions. For reasons of durability, the spring must be stretched radially, which is why radial projection 37 of bearing base 2 cannot be implemented in conjunction with a small installation space. Then, a separate stop cup 48 having a radial projection 37 is clamped between bearing base 2 and partition 7. This stop cup 48 gives rise to radial overlap 38 for transmitting high pulling forces.

What is claimed is:

1. A hydraulic bearing having a bearing axis, comprising:
   a supporting bearing having a receiving portion;
   a bearing base;
   an annular spring element of elastomeric material interconnecting the supporting bearing and the bearing base;
   a working chamber and a compensating chamber bounded by the supporting bearing and bearing base and filled with damping fluid;
   a partition having an opening separating the working chamber from the compensating chamber, the opening connecting the working chamber and the compensating chamber in a fluid-conducting manner; and
   an annular stop disposed in the working chamber and having an inner peripheral edge, the stop including a supporting body being completely sheathed with a jacket of elastomeric material and the inner peripheral edge being received in the receiving portion and supported by the receiving portion so as to allow movement of the annular stop in an axial direction but not in a cardanic manner relative to the supporting bearing, wherein a ratio of thickness of the inner peripheral edge in the axial direction and a height of the receiving portion in the axial direction is 0.5 to 1, and the supporting body includes at least three stiffening corrugations distributed uniformly in a circumferential direction.

2. The hydraulic bearing as recited in claim 1, wherein the ratio is 0.65 to 0.9.

3. The hydraulic bearing as recited in claim 1, wherein the receiving portion includes a radially outward open groove.

4. The hydraulic bearing as recited in claim 3, wherein the receiving portion includes a bottom extending substantially parallel to an axis of the hydraulic bearing and forming a base of the groove, and lateral boundary walls spaced axially from each other and extending essentially radially, the lateral boundary walls bounding the height of the receiving portion.

5. The hydraulic bearing as recited in claim 1, further comprising a fastening screw axially penetrating the supporting bearing from the working chamber to an exterior of the supporting bearing, and wherein the receiving portion is bounded by a body of the supporting bearing and a screw head of the fastening screw.

6. The hydraulic baring as recited in claim 1, wherein the receiving portion is bounded by a body of the supporting bearing and a disk connected to the supporting bearing.

7. The hydraulic bearing as recited in claim 1, wherein the receiving portion is at least partially coated with a coating of elastomeric material.

8. The hydraulic bearing as recited in claim 4, wherein the bottom provides an axially extending guide for the stop.

9. The hydraulic bearing as recited in claim 1, wherein the supporting body includes a bead-shaped enlargement at the inner peripheral edge.

10. The hydraulic bearing as recited in claim 9, wherein the annular spring element has a hollow cone shape.

11. The hydraulic bearing as recited in claim 4, wherein a diameter ratio of a diameter of the bottom and a diameter of the inner peripheral edge is 0.7 to 1.

12. The hydraulic bearing as recited in claim 11, wherein the diameter ratio is 0.8 to 0.95.

13. The hydraulic bearing as recited in claim 1, wherein a thickness ratio of a thickness of the jacket to a thickness of the supporting body is 0.1 to 0.5.

14. The hydraulic bearing as recited in claim 1, wherein the supporting body includes at least one of sheet metal and a polymeric material.

15. The hydraulic bearing as recited in claim 1, wherein the supporting body includes an outer peripheral edge and wherein the inner peripheral edge and the outer peripheral edge are each deformed in a same axial direction.

16. The hydraulic bearing as recited in claim 15, wherein the same axial direction is toward the partition.

17. The hydraulic bearing as recited in claim 1, wherein the stiffening corrugations are curved forward toward the spring element.

18. The hydraulic bearing as recited in claim 1, wherein a boundary wall of the working chamber surrounds an outer peripheral edge of the stop at a radial distance so as to form an annular gap for allowing a flow of the damping fluid through the gap.

19. The hydraulic bearing as recited in claim 1, wherein the stop has a flange extending radially for limiting extreme axial deflections of the stop.

20. The hydraulic bearing as recited in claim 19, wherein the flange and the annular spring element have a radial overlap larger than a radial component of an annular gap.

21. The hydraulic bearing as recited in claim 1, wherein the partition includes a nozzle cage having an upper part and a lower part and an elastic membrane disposed between the upper part and the lower part, the elastic membrane being capable of vibrating so as to isolate higher-frequency, small-amplitude vibrations.

22. The hydraulic bearing as recited in claim 21, wherein the partition includes a sealing bead between the upper part and the lower part for grasping the membrane, the upper part and lower part being locally recessed up to the sealing bead.

23. The hydraulic bearing as recited in claim 21, wherein the opening provides a damping conduit surrounding an outer circumference of the membrane and axially bounded by the upper part and the lower part.

24. A hydraulic bearing having a bearing axis, comprising:
a supporting bearing having a receiving portion;
a bearing base;
an annular spring element of elastomeric material interconnecting the supporting bearing and the bearing base;
a working chamber and a compensating chamber bounded by the supporting bearing and bearing base and filled with damping fluid;
a partition having an opening separating the working chamber from the compensating chamber, the opening connecting the working chamber and the compensating chamber in a fluid-conducting manner; and
an annular stop disposed in the working chamber and including a supporting body that is completely sheathed with a jacket of elastomeric material, the supporting body being bent at an inner peripheral region of the supporting body so as to form a tubular section about the bearing axis, a length of the tubular section in the axial direction being greater than a thickness of the supporting body, and the supporting body includes at least three stiffening corrugations distributed uniformly in a circumferential direction.

* * * * *